United States Patent
Valasopoulos

[19]

[11] Patent Number: 5,913,949
[45] Date of Patent: Jun. 22, 1999

[54] CONTROLLABLE DIRECT ENGAGEMENT DIFFERENTIAL WITH DISK AND RING COMBINATION CROSS-REFERENCE TO RELATED APPLICATIONS

[76] Inventor: Christos Valasopoulos, 22 Coritsas Str., 10447 Athens, Greece

[21] Appl. No.: 08/986,836

[22] Filed: Dec. 8, 1997

Related U.S. Application Data

[63] Continuation-in-part of application No. PCT/GR96/00010, Apr. 18, 1996.

[30] Foreign Application Priority Data

Jun. 7, 1995 [GR] Greece ............................... 950100220

[51] Int. Cl.⁶ ..................................................... F16H 48/14
[52] U.S. Cl. .............................................................. 74/650
[58] Field of Search ................................................ 74/650

[56] References Cited

U.S. PATENT DOCUMENTS

| | | | |
|---|---|---|---|
| 885,390 | 4/1908 | Sittmann | 74/650 |
| 1,278,231 | 9/1918 | Seeck | 74/650 |
| 1,467,560 | 9/1923 | Seeck | 74/650 |
| 1,499,480 | 7/1924 | Seeck | 74/650 |
| 1,663,882 | 3/1928 | Gould | 74/650 |
| 3,548,683 | 12/1970 | Fisher . | |
| 4,291,591 | 9/1981 | Ross | 74/650 |
| 4,841,809 | 6/1989 | Jolly | 74/650 |

FOREIGN PATENT DOCUMENTS

8805139 7/1988 WIPO .

*Primary Examiner*—Dirk Wright
*Attorney, Agent, or Firm*—Horst M. Kasper

[57] ABSTRACT

Differential comprising disks (1, 2) and rings (3, 4) inside a casing (15) being in full and continuous sliding state of contact with the outer pair of disks (6, 7) coupled to the output shafts. The inner sides of disks (1, 2) and rings (3, 4) are machined so that the plane surfaces on both sides of configurations (8, 10) and (9, 11) are inclined towards the perimeter under a certain inclination angle, allowing the convergence and divergence of the disks around configurations (8, 10). The outer plane surfaces of disks and rings of the inner pair (1, 2, 3, 4) are in full and continuous contact with the inclined circular planes (12, 13, 14) of the outer pair of disks (6, 7). On the periphery of the ring (3) are fitted plates (5) which can slide in a recess (16) of the inner surface of the casing (15). The configuration and arrangement of axles, disks, and rings allow the mechanism to move in a peculiar way, with harmonious rotation oscillations and achieving blocking in the case of partial or total adhesion loss of one driving wheel and the delivery of the remaining or even the whole torque to the wheel with greater adhesion and traction.

6 Claims, 7 Drawing Sheets

CONTROLLABLE DIRECT ENGAGEMENT DIFFERENTIAL WITH DISK AND RING COMBINATION CROSS-REFERENCE TO RELATED APPLICATIONS

CROSS-REFERENCE TO RELATED APPLICATIONS

This application is a continuation-in-part application of another international application filed under the Patent Cooperation Treaty on Apr. 18, 1996, bearing Application No. PCT/GR96/00010, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The present invention relates to the technical section of operation and application of differentials used in all types of wheeled vehicles. The present invention concerns differentials such as employed in connection with drive axles for motor vehicles.

2. Brief Description of the Background of the Invention Including Prior Art

A double-shuttle motion transmitting apparatus is taught in U.S. Pat. No. 4,291,591. A differential action between shaft members is provided by oscillation and reciprocation of the shuttle members in opposite directions relative to another axis disposed perpendicular to the shaft axis.

The U.S. Pat. No. 3,548,683 teaches a differential gear mechanism with wobbling inertia ring. A wobbling ring gear is disposed between two side gears in driving engagement therewith to develop an inertia torque bias for delivering torque to each of the two side gears carried by axially aligned power output shafts.

The International Patent WO 88/05139 teaches a nutating gear positraction or non-slip differential, which allows two shafts or wheels to rotate at different speeds, with one shaft or wheel faster than the other shaft or wheel. Two cam-operated nutating gear sets are employed in the gear and each axle or shaft is connected to the cams of the gear sets respectively.

In case of a conventional differential, it is well known that the sum of the speed on both wheels attached to the two sides of the differential is constant under a specific number of revolutions per minute of the engine. The sum of the speeds of two wheels of a conventional differential is directly proportional to the rotation speed of the motor shaft. Consequently, when both driving wheels are in traction on the pavement, with a different coefficient of friction $\mu$, then one wheel will accelerate and the other will decelerate with the well known undesirable effects. The one wheel with the lower adhesion or traction will spin, whereas the other wheel does not turn at all.

Figure 7:
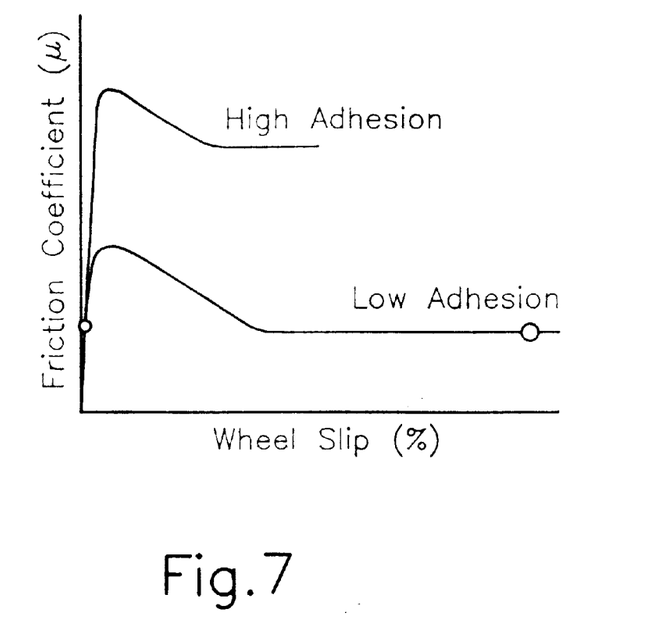
FIG. 7 shows a schematic diagram illustrating a graph showing the friction coefficient experienced by a wheel versus the wheel slip percentage for a conventional differential.

Under these conditions, the power transmitted by friction forces of the differential on both wheels is minimal and the vehicle is brought to a standstill (FIG. 7). When the wheel lacking traction spins, the wheel with traction will stop and therewith the whole motor vehicle will stop.

To overcome this difficulty, various differential types of limited slip were developed, which aim at improving the adhesion, with the variation of torque distribution, on the wheel with the greatest adhesion. While the conventional differential has a ratio of torque distribution 50:50 i.e., ratio of torque distribution 1:1 or sometimes 1.5:1, the limited slip differential (FIG. 8) alters this torque distribution in favor of the axle with the greater adhesion or traction to the ratio 80:20 or 4:1 and in some cases 6:1. That is to say, while the free-running wheel is in a condition of spinning and high loss of adhesion or traction loss, the other axle with high traction picks up a small speed and passes to a condition with a higher coefficient of friction.

Because these limited slip differentials use an engagement type between the two output axles, namely a clutch with disks fitted on the output axles, where the speed difference is balanced by the friction forces between the two disks, high friction forces occur resulting in the development of high temperatures and the quick wear of the system.

These limited slip differential systems also do not react promptly and allow the development of significant speed differences between the axles, resulting in the failure to avoid the spinning of the wheel with the lower adhesion or lower traction.

An evolution of these differentials are the differentials with cohesive engagement. In this case, the disks are perforated and special fluid flows through the disks. The balancing of the axle speeds is achieved by the variation of the fluid pressure and subsequently of the friction forces between the disks. The operation characteristics and the engagement time vary with the number of the disks, and the film thickness of the fluid.

The advantage of these differentials, compared to the simple engagement differentials, is their reduced weight and inertia.

The Torsen type differentials are a specific and peculiar planetary gear system. In the center of the system, worm gears form the output towards the axles, while on their perimeter and the inside of the casing three pairs of shafts are fitted with gears meshing with the sun gear disposed on the central axis of the gear train and between the gears.

This Torsen type system has the ability of rapid torque transmission to the axle of the wheel with the greater resistance, i.e. the wheel subjected to greater adhesion and traction. Consequently, the Torsen type system differs from the limited slip differentials, since the Torsen type system has an immediate reaction and does not allow for significant speed differences between the axles and also does not permit a spinning of the wheel exhibiting a lower friction and lower adhesion. The Torsen type system results therefore in an absence of spinning of the wheel accompanied by a lower traction. On the other hand, the Torsen system has problems based on the increased weight and inertia because of the large numbers of gears, and from the high friction levels resulting in wear and creating high temperatures. The ratio of the delivered torque could reach a value of 6:1.

Figure 8:
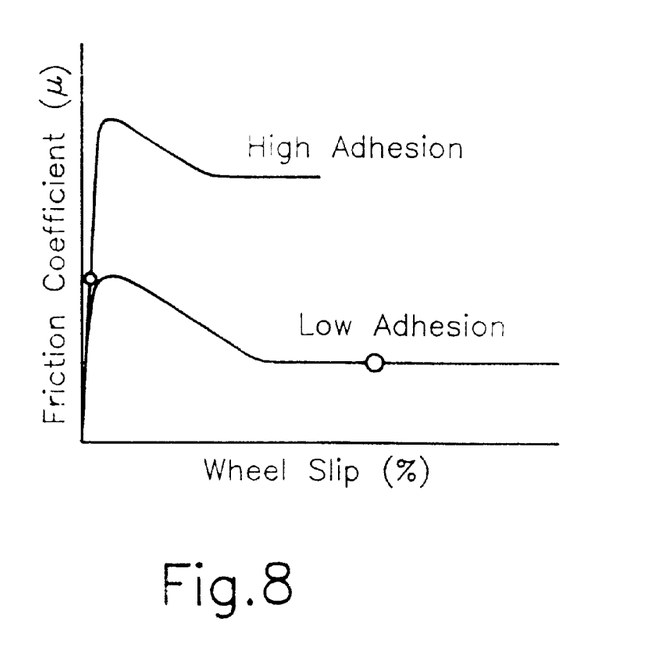
FIG. 8 shows a schematic diagram illustrating a graph showing the friction coefficient experienced by a wheel versus the wheel slip percentage for a limited slip differential.

Some of these disadvantages have been reduced by the use of improved metal alloys and a simplification of the system. Features from Patent eqivex are making the Torsen type system lighter and simpler, but it still is at a disadvantage concerning the torque distribution, wherein the ratio of the distributed torques reaches up to 3:1 (FIG. 8).

Finally, with the new RICARDO differential currently under testing, the transmission is not achieved through gears but through a cross disposed and fitted on the differential shaft, wherein the cross is able to slide and rotate simultaneously.

The ball-shaped ends of the cross are properly fitted with disks and are connected with the output axles. In this system, the variation of torque distribution depends not only on the speed difference but also on the load, whose variation, along with the variation of the friction coefficient through the help of an oil film, results in the transmission of a greater torque to the axle with a lower speed.

Tests have shown that the amount of the change of the torque distribution ratio depends on the selected speed ranging from 5:1 up to a minimum of 2:1.

SUMMARY OF THE INVENTION

1. Purposes of the Invention

It is an object of the present invention to furnish a self-locking differential.

It is another object of the present invention to furnish a differential inducing the two wheels associated with the differential moth to run at optimum traction conditions without any disadvantage introduced thereby to other systems of the differential.

These and other objects and advantages of the present invention will become evident from the description which follows.

2. Brief Description of the Invention

The present invention differs radically from the previously mentioned differential mechanisms as clearly results from the arrangement, configuration, and operation of the invention mechanism [as described in the following pages].

The present invention provides for a new mechanism and method for its drive consisting of a combination of disk pairs and rings in contact, moving in a unique way due to their proper arrangement and shape, and their motion delivered always towards an opposite rotation, through two properly set axles located in the center of the differential "axis".

The combination of the arrangement, shape, and motion of two disk pairs and rings of the invention mechanism, through properly set axles, located in the center of the differential "axis", allows the operation of the invention mechanism either as a conventional differential in the case of normal adhesion and traction of the drive wheels or as a direct engagement drive in the case of any adhesion and traction loss, i.e., reduction of friction coefficient of one wheel, in which case the mechanism locks with the respective engagement of the disk pair and rings, achieving the delivery of the remaining torque to the wheel with adhesion and traction loss, in favor of the wheel with the greater adhesion and traction, and of the whole torque in the extreme case of minimal or zero coefficient of friction $\mu=0$, in favor again of the wheel with the greater adhesion and traction.

This engagement capability of the mechanism makes it possible to increase or decrease in the various embodiments, according to manufacturer requirements, through the increase or decrease of the inclination angle of the inclined plane surfaces machined on a pair of disks.

Due to the lack of any gears, balls, and small machine elements with small contact surfaces or point contacts from the whole mechanism system, and the cooperation only of large engaged surfaces, the mechanism has the advantages, as compared with the previously mentioned mechanisms, of friction elimination and high load carrying capacity.

It is obvious that all the elements of the differential take part continuously and as a whole in the operation of the mechanism. In contrast to other systems, there is no partial or incomplete power efficiency of the mechanism.

Because the invention differential is affordable to manufacture and uses small-size machine elements for the mechanism, operating in a small space, the size and the weight of the differential is substantially reduced, with the inertia forces kept to a minimum.

From the previously described is obvious on the one hand the efficiency, simplicity, and reliability of the system and, on the other hand, the elimination of wear and damage and, consequently, the increased and faultless system service life. In addition to that, the manufacture of the various differential components is easily executed with simple machining processes, and its manufacturing cost is definitely lower than any other differential techniques already in use. It can be used on any type of wheeled vehicle, on road, off road, of special type, easily adjustable to the required specifications of any vehicle type. In addition to that, it can be used as a central differential in the case of more than one driving axles.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 4b is a sectional view of the construction according to the invention shown in FIG. 4a, however, with the shaft turned by 90 degrees and the right-hand outer disk turned by 180 degrees relative to their position in FIG. 4a;

FIG. 4c is a partial sectional view of the embodiment according to FIG. 4a;

DESCRIPTION OF INVENTION AND PREFERRED EMBODIMENT

Referring to FIGS. 1, 2, 3, 4, an application is illustrated of the controlled direct engagement differential comprising: the disk 1, 2, the rings 3, 4 the plates 5 and the outer pair of disks 6, 7.

Figures 1, 1B:
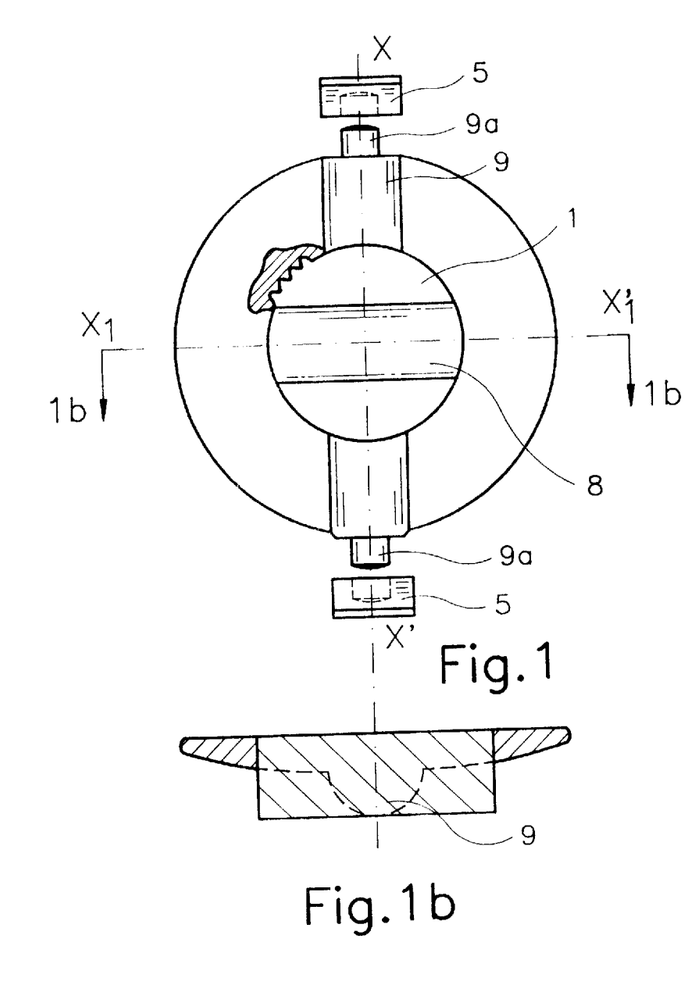
FIG. 1 is a front elevational view of a first disk with mounted shafts and a fitted ring belonging to an inner pair of disks.
FIG. 1b is sectional view of the disk of FIG. 1 along section line A—A'.
Figure 1A:
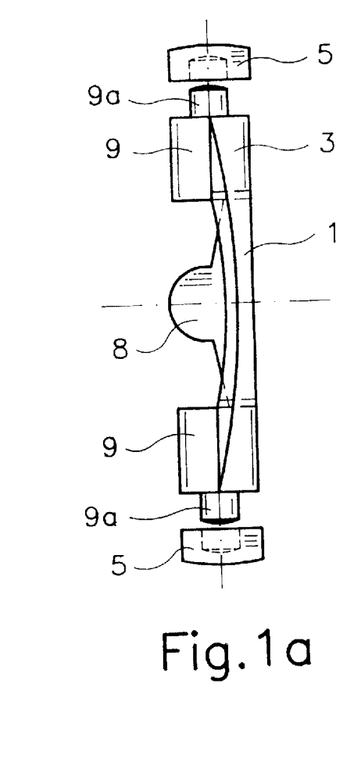
FIG. 1a is a side elevational view of the embodiment of FIG. 1.

Proper serrations are machined on the disk 1 periphery for mounting the disk inside the respective serrated bore of ring 3. The disk 1 is solidly connected to the ring 3. After mounting disk 1 and ring 3, their outer side appears as a uniform plane, circular, surface.

The one inner side disk 1 has on its inner side diametrically a semi-cylindrical protrusion 8 and the one ring 3 has on its inner side diametrically opposite two semi-cylindrical extensions 9 so that their axis x1 x1' is inclined to the axis xx' of the semi-cylindrical protrusion 8 of disk 1. The inclination angle between the axes x1 x1' and xx' is preferably 90 degrees. The extensions 9 protrude on the inner side of the ring 3 and the cylindrical axis of the extensions 9 is disposed perpendicular to the axis of the semi-cylindrical protrusion 8 and these axes preferably are disposed in a plane running parallel to the plane of the outer side of disk 1 and ring 3. The diameters of the semi-cylindrical extensions 9 and of the semi-cylindrical protrusions 8 are preferably equal.

On the periphery of said one ring 3 are fitted diametrically opposite two semi-cylindrical shafts 9a, at the ends of these shafts, plates 5 are attached forming a joint. Plates 5 having each a cylindrical recess are attached to the semicylindrical shafts 9a which in turn are attached to the semicylindrical extensions 9.

Figure 2:
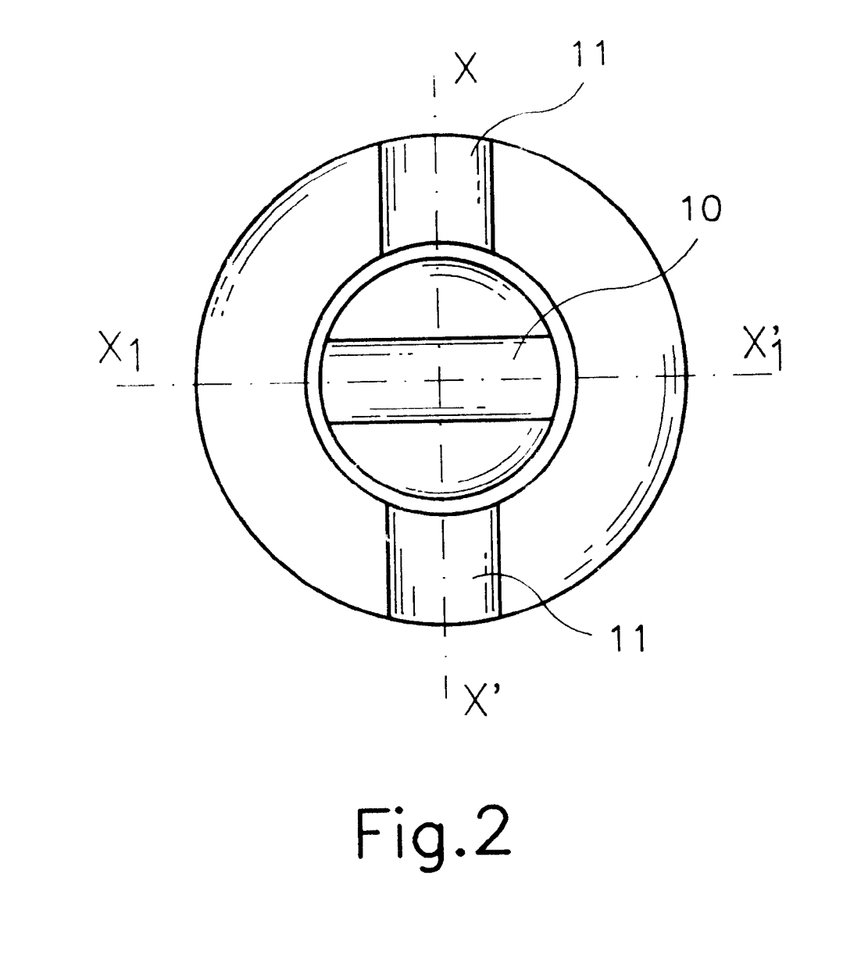
FIG. 2 is a front elevational view of a second disk and of a second ring belonging to the inner pair of disks.
Figure 2A:
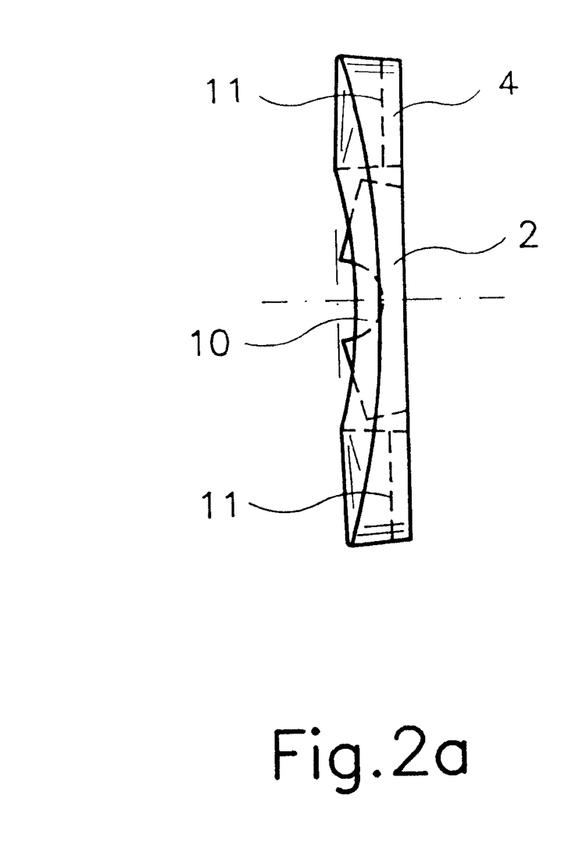
FIG. 2a is a side elevational view of the embodiment of FIG. 2.

Disk 2 is constructed to be freely rotatable inside the inner bore of ring 4. Disk 2 is preferably of equal diameter with disk 1 and is assembled, so that it can move freely inside the bore of ring 4. Disk 2 is constructed to with a semicylindrical groove 10 to engage the semi-cylindrical protrusion 8. The inner side of disk 2 has a semi-cylindrical groove 10 on a diametrical position respective to the semi-cylindrical protrusion 8 of disk 1.

It is possible if desired to exchange mutually the recess of the disk 2 with the semi-cylindrical protrusion 8 of the disk 1 as well as the grooves 11 of the ring 4 can be exchanged with the semicircular extension 9 of the ring 3.

The inner side of ring 4 has the semi-cylindrical grooves 11 on a diametrically opposite position respective to the semi-cylindrical extensions 9 of ring 3 of disk 1. The grooves 11 are constructed to match hingedly the shape of the semi-cylindrical extensions 9.

Figures 3A, 3B:
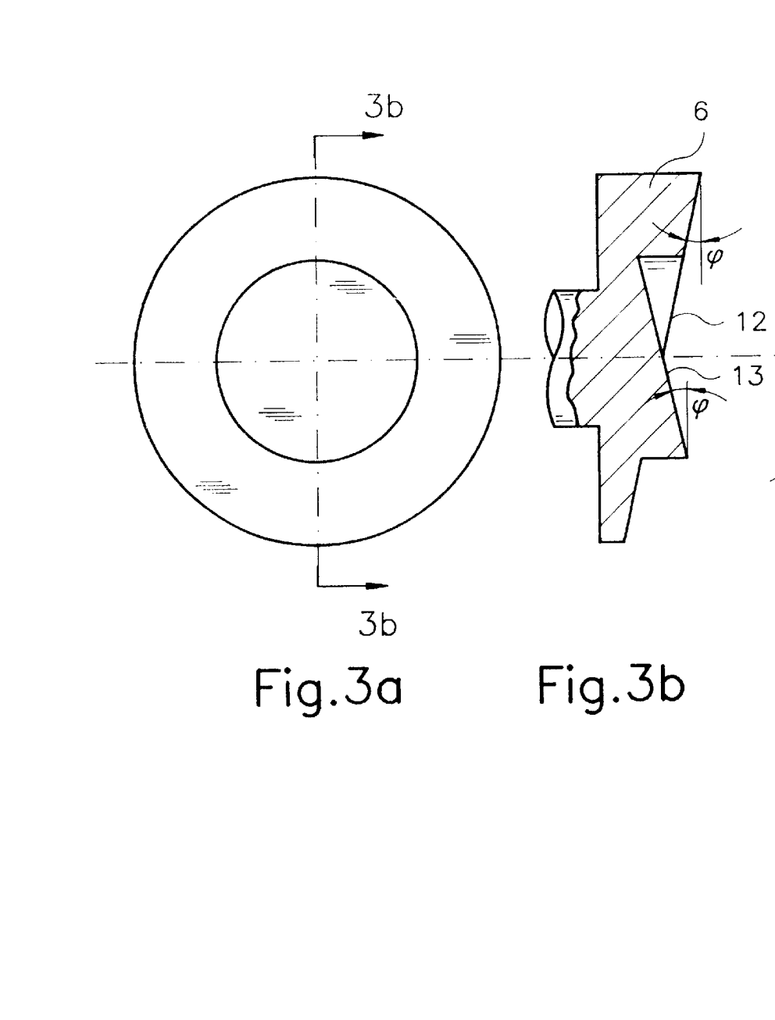
FIG. 3a is a front elevational view of a first outer disk.
FIG. 3b is a sectional view of the embodiment of FIG. 3a along section line A—A'.
Figure 3C:
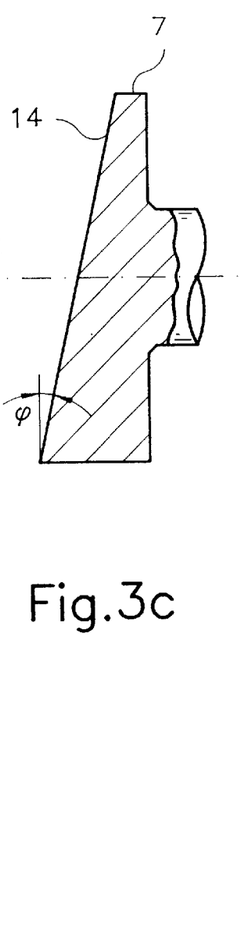
FIG. 3c is a front elevational view of a second outer disk.
Figure 3D:
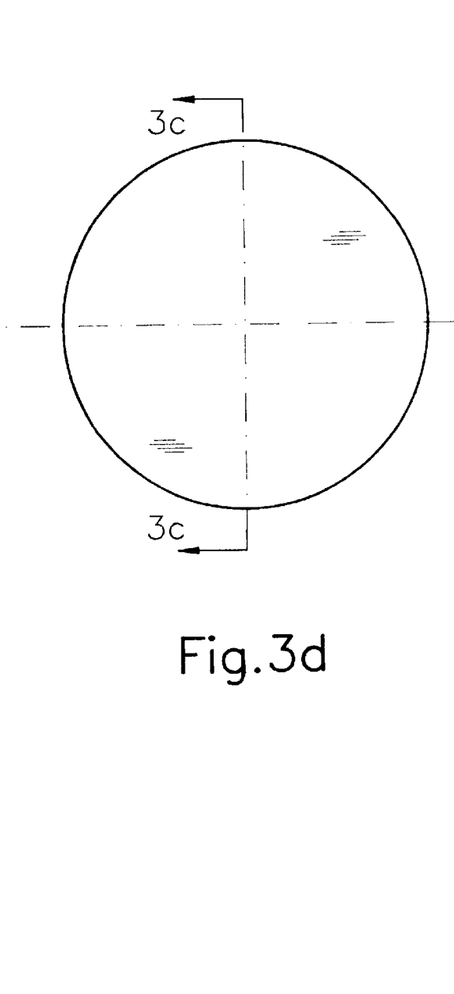
FIG. 3d is a sectional view of the embodiment of FIG. 3c along section line B—B'.

The inner sides of disks 1, 2 and rings 3, 4 are machined, so that the plane surfaces on both sides of configurations 8, 10 and 9, 11 are inclined towards the perimeter under a certain inclination angle φ shown in FIGS. 3b and 3d, allowing the convergence and divergence of the disks around configurations 8, 10 and allowing the disks 1, 2 to tilt around the axis of the semi-cylindrical protrusion 8 and allowing the rings 3, 4 to tilt around the axis of the semi-cylindrical extensions 9.

Figure 4A:
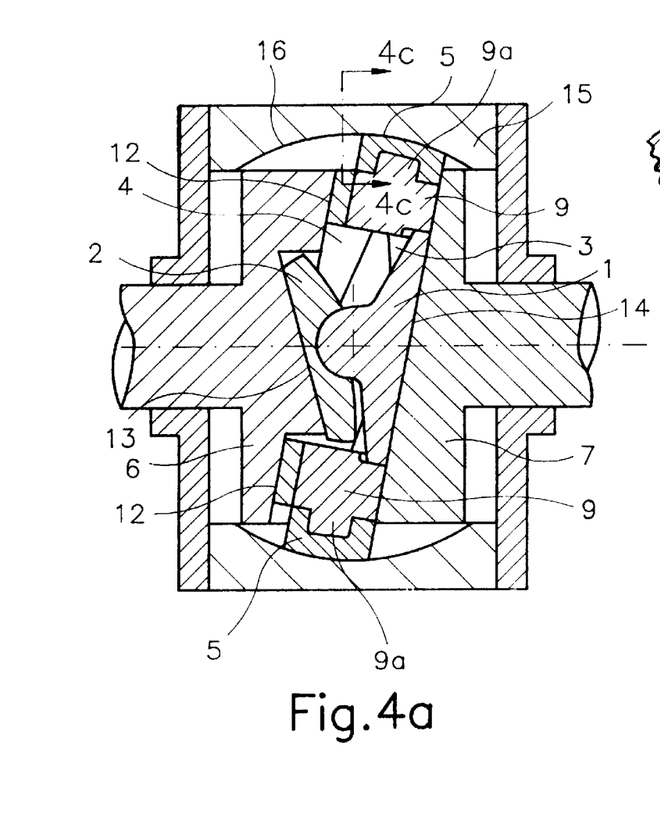
FIG. 4a is a sectional view of a construction according to the invention during a simultaneous movement of the inner and outer pair of disks, wherein a motion of plates is constrained by a recess.
Figures 4B, 4C:
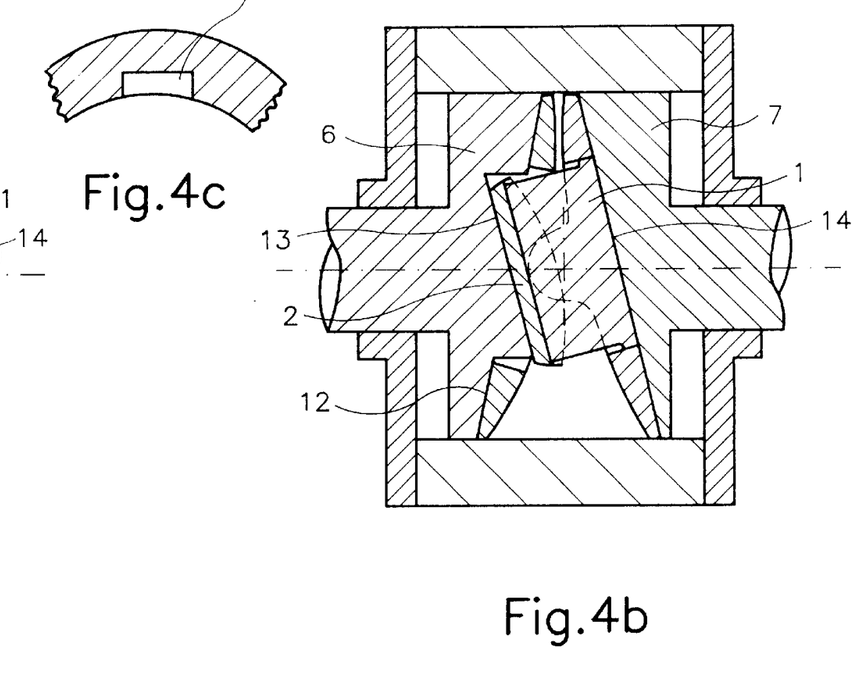

The outer plane surfaces of disks and rings of the inner pair 1, 2, 3, 4 are in full and continuous contact with inwardly directed surfaces 12, 13, 14 of the outer pair of disks. The disk 6 is constructed so that its inner face is subdivided into an inner circle face 13 to engage the outer face of the disk 2 and an inner ring face 12 surrounding the inner circle face 13 to engage the outer face of the ring 4. The inner circle face and the inner ring face are each flat and inclined to a plane perpendicular to the rotation axis by angles φ and, respectively, -φ. The outer pair of disks 6, 7 is coupled to the output axles of the respective driving wheels of a motor vehicle. Said disks 6, 7 have a cylindrical shape and their outer plane surfaces slide on the casing 15 during mechanism operation as shown in FIGS. 4a and 4b.

The inner side of disk 6 comprises: a circular plane surface 12, inclined towards the vertical direction to a φ angle and a concentric circular plane surface 13 inclined towards the vertical direction to a same φ angle, but to a direction opposite to that of surface 12.

The inner side of disk 7 forms a uniform circular plane surface 14 inclined to an angle φ equal to the angle φ of disk surfaces 6.

The assembling of the mechanism is executed as follows: plates 5 are located on the proper recess 16 of the inner surface of casing 15, sliding on it, during its rotation. Ring 3 with shafts 9a together with plates 5 is fitted on the periphery of disk 1. The plates 5 slide around a circle of the recess 16, wherein the motion of the plates 5 occurs within a plane containing the rotation axes of the disks 6 and 7.

On the semi-cylindrical protrusion 8 of disk 1 is adapted, through groove 10, disk 2 forming a joint with a hinge-like connection. About this joint wobble converging and diverging both disks 1, 2 during transmission of drive. The wobbling occurs, when the disks 6 and 7 rotate relative to each other. The disks 1 and 2 oscillate around the axis of the semi-cylindrical protrusion 8 when the disk 6 rotates relative to the position of disk 7.

Ring 4 is assembled encircling and surrounding disk 2, such that disk 2 can freely move while surrounded by ring 4. Grooves 11 form with the respective semi-cylindrical extensions 9 of ring 3 joints. About these joints ring 3 with disk 1 and ring 4 converge and diverge during transmission of drive.

Finally disks 6, 7 are assembled and the inclined surface 12 of disk 6 is in full and continuous contact with the outer flat surface of ring 4, the opposite inclined inner surface 13 of same disk 6 is in full and continuous contact with outer surface of disk 2 and the uniform inclination plane surface 14 of disk 7 is in full and continuous contact with the uniform outer plane surface of disk 1 and ring 3.

On said surfaces for optimum sliding characteristics proper means for improving these characteristics are applicable. During mechanism operation, we observe the following mode of movement of mechanism disks and rings and their direct controllable engagement in relation to the driving and road surface conditions.

With the rotation of the casing, drive is transmitted through sliding plates 5 to the shafts 9a, ring 3, disk 1, ring 4 and disk 2 with the help of their respective joints.

Simultaneously this drive is transmitted, through rotation and convergence, divergence (wobbling) of inner pair of disks and rings, to the outer pair of disks 6, 7, wherein their outer plain surfaces slide on the inside surface of the casing.

The surfaces 12 and 14 are disposed parallel during at all times with and without mutual rotation of shafts 6 and 7. As the plate 5 moves in the groove 16, simultaneously the disk 2 wobbles with the same frequency. While the plate 5 moves one cycle, the disk 6 rotates around 360 degrees and the disk 7 rotates around 360 degrees in an opposite direction to the rotation direction of disk 6.

The inner surfaces 12, 13, 14 of said disks and rings as they move, slide in contact with surfaces 4, 2, 1, 3 respectively. Said surfaces of disks 6, 7 during casing rotation are moving with a sequence of convergences, parallel movements, and divergences and as it is obvious they are moving with an opposite sequence of movements compared to that of the inner disks-rings pair surfaces. During casing rotation, the mutually oppositely directed motion of the shafts relative to each other is superimposed for the respective shaft to the rotation speed of the casing.

The opposite inclination of surface 13 of disk 6 as compared to the inclined surface 12 of the same disk, along with angle φ is a characteristic and a necessary requirement for the operation of the present mechanism and also for the engagement and direct torque transmission to the driving wheels in the cases of adhesion loss, as follows:

In the case of a drive with normal adhesion the present invention operates as an ordinary differential, for example when the rotational speeds of driving wheels are different, then the rotation of the outer pair of disks, transmitted to the inner pair of disks, is of opposite direction and differing speed for each outer disk comprising the pair resulting in the present engagement system to act as an ordinary differential. The difference in speeds between the wheels is balanced by the rotation in opposite direction of the disks 6 and 7, while the average rotation speed of the wheels is the speed with which the casing rotates.

As the angle φ approaches the value 0, the differential stops working as the disks 6 and 7 are capable of rotating freely relative to each other. The tangent of the angle φ is substantially limited by the value of the inner diameter of the casing divided by the inner length of the casing. As the angle φ increases, the interaction between the disks 6 and 7 increases and at the same time the path of the plate 5 increases resulting in larger and larger friction losses and a stronger coupling and restriction of the relative motion of the two wheels on the axle.

In any other case of adhesion loss of a driving wheel i.e., reduction of friction coefficient, the mechanism is acting as differential of direct engagement wherein the engaged disk and ring surfaces forced due to their configuration and arrangement to move with an opposite rotational movement and specifically due to the configuration of angle φ, inclined plane surfaces 12, 13, 14, allowing the direct engagement of the mechanism to a degree dependent on the adhesion loss level of the driving wheel.

In these cases we observe a direct torque delivery from the spinning driving wheel to the wheel with the greater adhesion.

The value of said torque delivered, is proportional to the adhesion loss level. In the case where the friction coefficient is zero $\mu=0$, the whole torque of the spinning wheel is delivered directly to the wheel with the greater adhesion. The size of angle φ of the inclined surfaces of disks 6, 7 defines the degree of engagement of the mechanism in the cases of adhesion loss, with an indirectly proportional relation.

Figure 5:
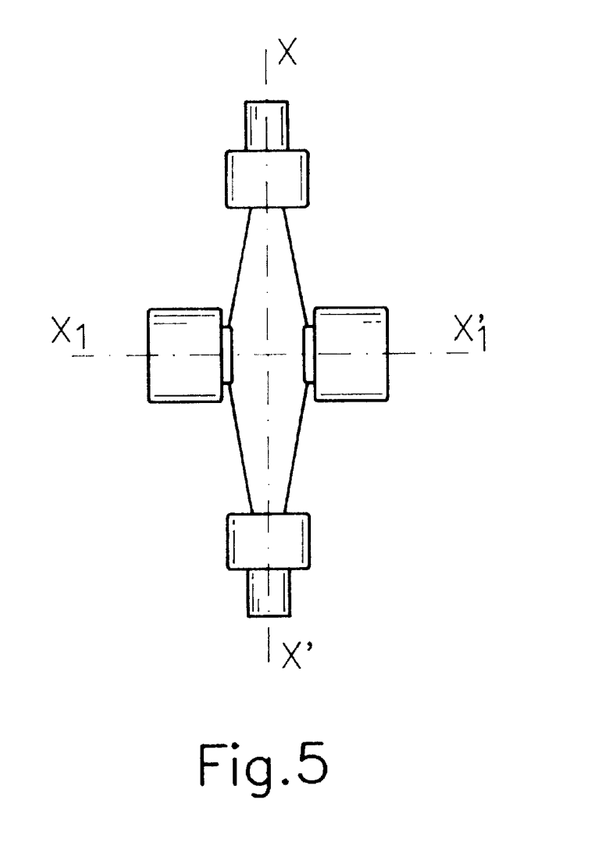
FIG. 5 shows a sectional view of a mechanism shaft of a second embodiment.
Figure 6:
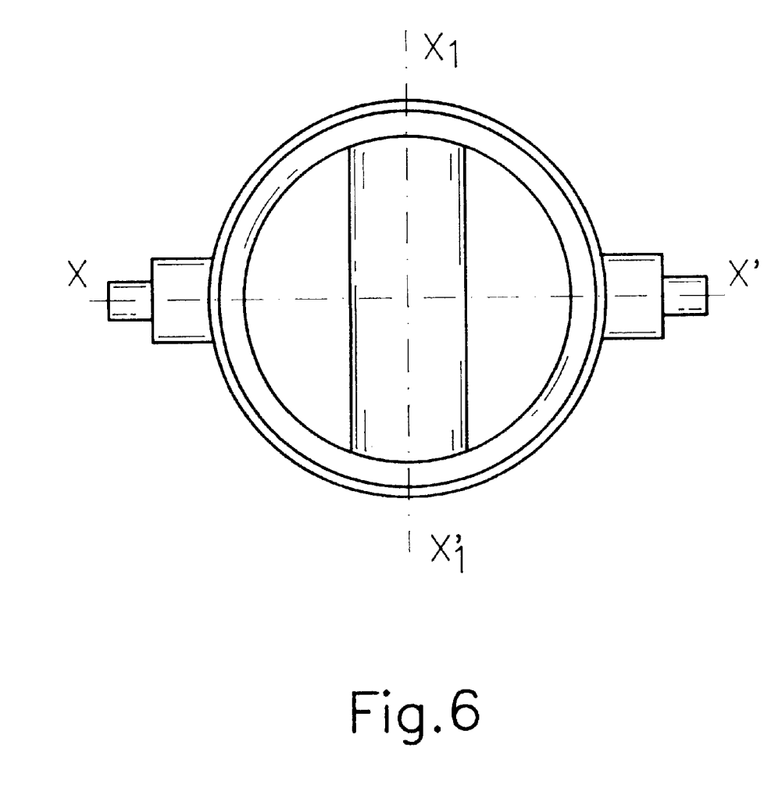
FIG. 6 shows a sectional view of a mechanism shaft of a third embodiment.

FIGS. 5, 6 illustrate various arrangements of shafts xx' and x1x'1 from the described arrangement in FIGS. 1, 2.

FIG. 5 shows a crosswise arrangement of shafts, on which converge and diverge the disks of inner and outer pair. The extensions in the axis xx' corresponding to the semi-cylindrical extensions 9, 9a in FIG. 1 are cylindrical extensions.

FIG. 6 shows another embodiment with shafts xx and x1 x2 arranged on a ring. The extensions in the axis xx' corresponding to the semi-cylindrical extensions 9, 9a in FIG. 1 are cylindrical extensions.

FIG. 7 shows a schematic diagram illustrating a graph showing the friction coefficient experienced by a wheel versus the wheel slip percentage for a conventional differential, wherein when the wheel slip is maximized in one wheel, then the second wheel is not turning.

FIG. 8 shows a schematic diagram illustrating a graph showing the friction coefficient experienced by a wheel versus the wheel slip percentage for a limited slip differential. The speed difference between the wheels is reduced based on a limited slip differential and the wheel with the better adhesion and traction acquires a small speed, which allows the increase in the adhesion force.

Figure 9:
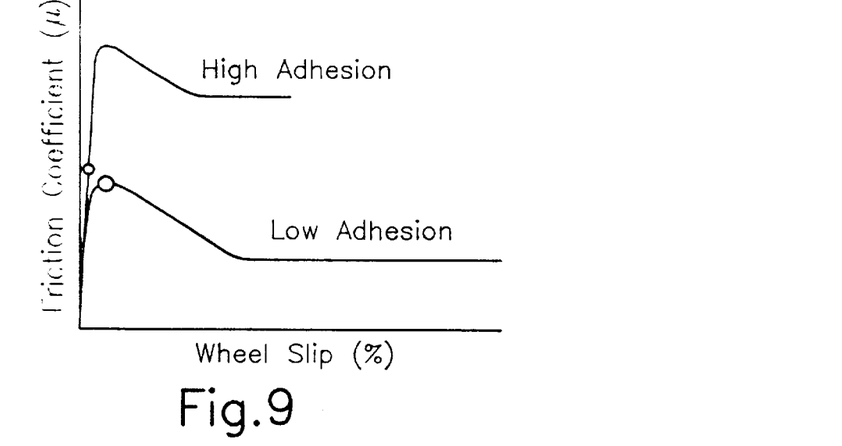
FIG. 9 shows a schematic diagram illustrating a graph showing the friction coefficient experienced by a wheel versus the wheel slip percentage for a differential with an electronic adhesion control system (A.S.R. anti-spin regulation traction control system)

FIG. 9 shows a schematic diagram illustrating a graph showing the friction coefficient experienced by a wheel versus the wheel slip percentage for a differential with an electronic adhesion control system called A.S.R. anti-spin regulation traction control system. The speed reduction of the wheel with the reduced adhesion and reduced traction lowers the wheel slip and allows the increase of adhesion force based on the electronic adhesion control system.

Figure 10:
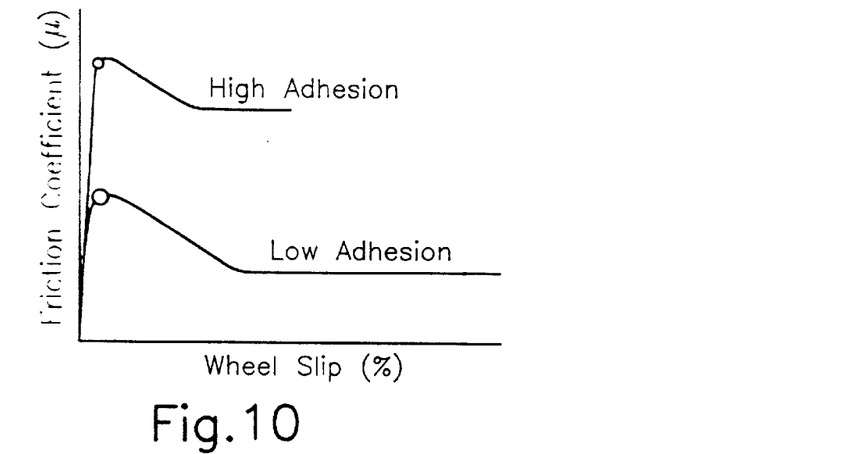
FIG. 10 shows a schematic diagram illustrating a graph showing the friction coefficient experienced by a wheel versus the wheel slip percentage for a limited slip differential with electronic adhesion control (A.S.R., anti-spin regulation traction control system)

FIG. 10 shows a schematic diagram illustrating a graph showing the friction coefficient experienced by a wheel versus the wheel slip percentage for a limited slip differential with electronic adhesion control called A.S.R., anti-spin regulation traction control system. Both wheels are operating on their optimum wheel slip range with a combination of a limited slip differential and an anti-spin regulation.

Figure 11:
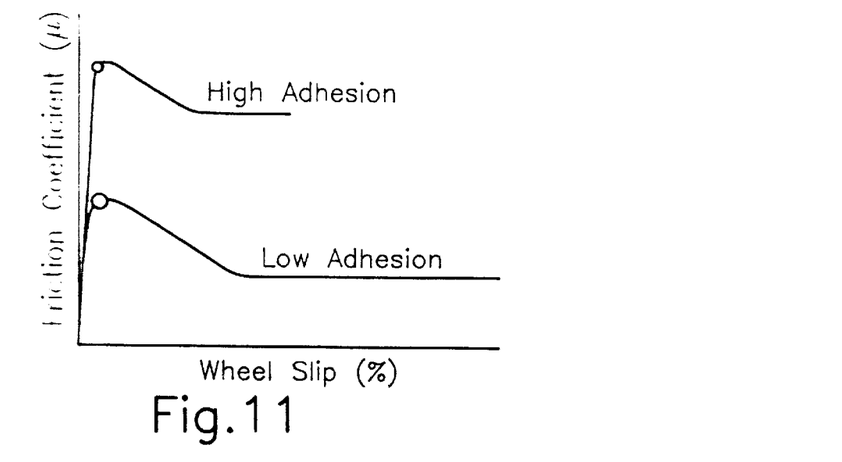
FIG. 11 shows a schematic diagram illustrating a graph showing the friction coefficient experienced by a wheel versus the wheel slip percentage for a self-locking differential according to the present invention.

FIG. 11 shows a schematic diagram illustrating a graph showing the friction coefficient experienced by a wheel versus the wheel slip percentage for a self-locking differential according to the present invention. Both wheels are operating at their optimum for all riding conditions with the self locking differential of the present invention without showing any disadvantages in other parts of the system or vehicle.

The angle φ can have a value of from about 3 degrees to about 45 degrees and preferably an angle from about 10 to 30.

It will be understood that each of the elements described above, or two or more together, may also find a useful application in other types of differentials differing from the types described above.

While the invention has been illustrated and described as embodied in the context of a controllable direct engagement differential with disk and ring combination, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. Controllable direct engagement differential comprising a casing to be coupled to a direct input for the differential; an axis of the differential;

a first inner disk disposed centered relative to the axis having on its inner side a first hinge means and wherein the outer side of said first inner disk has a planar circular surface;

a second inner disk disposed centered relative to the axis having on its inner side a second hinge means and wherein the outer side of said second inner disk has a planar circular surface;

a first ring encircling the first inner disk, wherein the first ring is solidly attached to said first inner disk to rotate with said first inner disk, wherein the outer side of said first ring forms with the outer side of said first inner disk a uniform planar surface and wherein the inner side forms a first engagement means;

a first cylindrical shaft attached to a periphery of the first ring;

a first end plate engaged by the first cylindrical shaft and born by the first cylindrical shaft, wherein the first end plate is in a slidable contact with an inner surface of a first suitable recess furnished in said casing;

a second cylindrical shaft disposed coaxially to the first shaft and attached to a diametrically opposite side of the periphery of the first ring;

a second end plate engaged by the second cylindrical shaft and born by the second cylindrical shaft, wherein the second end plate is in a slidable contact with an inner surface of a second suitable recess furnished in said casing;

a second ring disposed surrounding the second inner disk such that the second inner disk is capable of moving freely inside an interior of said second ring and wherein the outer side of the second ring is planar and wherein the inner side of the second ring forms a second engagement means, wherein the second engagement means is capable of engaging the first engagement means such that the first ring and the second ring are adapted to be disposed engaged and moving together such that the outer faces of the first ring and of the second ring are disposed parallel to each other;

a first outer disk forming a first output to be connected to a first driving wheel of a vehicle and defining a plane perpendicular to the axis and which plane is in contact with a respective first inner surface of the casing, having an inner side comprising one annular plane surface inclined at an angle ($\phi$) towards said defined plane, and a circular plane surface inclined towards said defined plane at a like angle ($\phi$), but disposed in a direction opposite to that of said annular plane surface;

a second outer disk forming a second output to be connected to a second driving wheel of a vehicle, wherein the second outer disk has an inner side forming a uniform circular plane surface inclined to an angle equal to said angle ($\phi$) of said first outer disk, wherein said inner surfaces of said outer disks are in full and continuous slidable contact with the outer plane surface of said first ring, said second ring, said first inner disk, and said second inner disk, respectively, whereby said elements of the differential functions in the case that the wheels of the vehicle move with normal adhesion as an ordinary differential, and wherein said elements of the differential functions in the case that the wheels of the vehicle move with abnormal adhesion, i.e. a reduction of friction coefficient of one driving wheel, as a blocked differential.

2. The controllable direct engagement differential according to claim 1 wherein the first hinge means is a semi-cylindrical protrusion, and wherein the second hinge means is a semi-cylindrical recess.

3. The controllable direct engagement differential according to claim 1 wherein the first engagement means is a semi-cylindrical protrusion, and wherein the second engagement means is a semi-cylindrical recess.

4. Controllable direct engagement differential with disks and rings arranged in a casing (15), for a vehicle with driving wheels, which casing provides a rotatable input of said differential, comprising:

(a) a pair of inner disks (1, 2) located in the center of the differential axis, whereby
  (i) the one inner disk (1) has on its inner side diametrically a semi-cylindrical protrusion (8), the outer side of said one disk has a plane circular surface,
  (ii) the other inner disk (2) has on its inner side a groove (10) of semi-cylindrical cross section mating with said semi-cylindrical protrusion (8), the outer side of said disk has a plane circular surface, (b) two rings (3, 4) encircling said inner disks (1, 2) respectively, whereby
  (i) the one ring (3) is mounted on the periphery of said one inner disk (1) to rotate therewith, the outer side of said one ring (3) appears with the outer side of said one inner disk (1) as a uniform plane circular surface,
  (ii) said one ring (3) has on its periphery, diametrically opposite, two cylindrical shafts (9a), which shafts bear on their ends plates (5), which plates are in slidable contact with an inner surface of a suitable recess (16) provided in said casing (15),
  (iii) said one ring (3) has on its inner side, diametrically opposite, two semi-cylindrical extensions (9),
  (iv) the other ring (4) is mounted on and encircles said other inner disk (2), which disk (2) can move freely inside the bore of said other ring (4),
  (v) said other ring (4) has on its inner side, diametrically opposite, two proper grooves (11) to mate with said two semi-cylindrical extensions (9) provided on said one ring (3), (c) an outer pair of disks (6,7), which outer disks provide two rotatable outputs of said differential, whereby
  (i) each outer disk (6) and (7) has a plane which is vertical to the differential axis and which is in contact with a respective inner surface of the casing (15),
  (ii) the one outer disk (6) has an inner side comprising one circular plane surface (12) inclined at an angle ($\phi$) towards said vertical direction plane, and another circular plane surface (13) inclined towards said vertical direction plane at the same angle ($\phi$), but in a direction opposite to that of said one circular plane surface (12),
  (iii) the other outer disk (7) has an inner side forming a uniform circular plane surface (14) inclined to an angle equal to said angle ($\phi$) of the surfaces (12, 13) of said one outer disk (6),
  (iv) said inner surfaces (12, 13, 14) of said outer disks (6, 7) are in full and continuous slidable contact with the outer plane surfaces of said two rings (3, 4) and of said inner disks (1, 2) respectively, (d) whereby said elements of the differential functions in the case that the wheels of the vehicle move with normal adhesion as an ordinary differential, and (e) whereby said elements of the differential functions in the case that the wheels of the vehicle move with abnormal adhesion, i.e. a reduction of friction coefficient of one driving wheel, as a blocked differential.

5. Controllable direct engagement differential with disks and rings according to claim 4, wherein the inner disks and rings have the following configurations:

(i) the inner sides of disk (1, 2) are properly configured so that next to the semi-cylindrical protrusion (8) and groove (10) respectively both semicircular plane surfaces are inclined towards the disks periphery under a desired angle allowing the wobbling of disks (1, 2) about the protrusion (8) and groove (10), (ii) the inner side of rings (3, 4) is configured on both sides next to extensions (9) and grooves (11) in an inclination form to an angle equal to the angle of the respective disks (1, 2).

6. Controllable direct engagement differential with disks and rings according to claim 4, wherein the magnitude of the chosen equal angles ($\phi$) of the inner inclined surfaces (12, 13, 14), of outer disks (6, 7) determines the desirable blocking degree of said mechanism in an inversely proportional manner.

* * * * *

UNITED STATES PATENT AND TRADEMARK OFFICE
CERTIFICATE OF CORRECTION

PATENT NO. : 5,913,949
DATED : June 22, 1999
INVENTOR(S) : Christos Valasopoulos It is certified that error appears in the above-identified patent and that said Letters Patent is hereby corrected as shown below:

On the title page item [54], and column 1, lines 3-4, delete "CROSS-REFERENCE TO RELATED APPLICATIONS"

Signed and Sealed this

Twenty-first Day of December, 1999

Attest:

Q. TODD DICKINSON

*Attesting Officer*   *Acting Commissioner of Patents and Trademarks*